(12) United States Patent
Woellper et al.

(10) Patent No.: US 11,884,045 B2
(45) Date of Patent: Jan. 30, 2024

(54) STRUCTURAL LAMINATE COMPONENT

(71) Applicant: Haworth, Inc., Holland, MI (US)

(72) Inventors: Randolph Woellper, Hudsonville, MI (US); Steffen Lipsky, Holland, MI (US); Landan Jacobs, Blissfield, MI (US); Kevin Hirdes, Holland, MI (US); Angela Hupcik, West Olive, MI (US); Ross Johnson, Hudsonville, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 17/848,144

(22) Filed: Jun. 23, 2022

(65) Prior Publication Data

US 2023/0415447 A1 Dec. 28, 2023

(51) Int. Cl.
| | |
|---|---|
| *B32B 3/04* | (2006.01) |
| *B32B 3/26* | (2006.01) |
| *B32B 5/18* | (2006.01) |
| *B32B 37/18* | (2006.01) |
| *B32B 37/12* | (2006.01) |
| *B32B 7/12* | (2006.01) |

(52) U.S. Cl.
CPC .............. *B32B 3/04* (2013.01); *B32B 3/266* (2013.01); *B32B 5/18* (2013.01); *B32B 7/12* (2013.01); *B32B 37/12* (2013.01); *B32B 37/182* (2013.01); *B32B 2266/0228* (2013.01); *B32B 2307/732* (2013.01); *Y10T 428/239* (2015.01)

(58) Field of Classification Search
None
See application file for complete search history.

(56) References Cited

U.S. PATENT DOCUMENTS

| 4,450,193 A | * | 5/1984 | Staebler | .................. B32B 27/12 |
| | | | | 428/102 |
| 4,729,705 A | * | 3/1988 | Higgins | ................ F16B 37/122 |
| | | | | 52/704 |
| 4,865,807 A | | 9/1989 | Petershofer et al. | |
| 5,275,862 A | | 1/1994 | Ramadan et al. | |
| 5,422,155 A | | 6/1995 | Spence, Jr. | |

(Continued)

FOREIGN PATENT DOCUMENTS

| DE | 102021104912 A1 | * | 9/2021 |
| WO | 1999018150 A1 | | 4/1999 |

(Continued)

OTHER PUBLICATIONS

Machine translation of DE-102021104912 retrieved Oct. 2022.*

*Primary Examiner* — Alexander S Thomas
(74) *Attorney, Agent, or Firm* — Warner Norcross + Judd LLP

(57) ABSTRACT

The present invention provides a structural laminate component that includes first and second panels formed of a sheet material, the top and bottom edges and the lateral sides combining to form an outer perimeter edge. A core is sandwiched between the first and second panels, the core having an outer peripheral edge spaced inwardly from the outer perimeter edges of the first and second panels. An adhesive is applied between the first and second panels, the adhesive directly joining the inner surface of the first panel with the inner surface of the second panel in an area extending around and adjacent to the outer perimeter edge to form an integral frame that provides aesthetics and structure to the component.

19 Claims, 12 Drawing Sheets

(56) References Cited

U.S. PATENT DOCUMENTS

| | | | |
|---|---|---|---|
| 5,811,167 A * | 9/1998 | Norvell | B29C 65/02 |
| | | | 428/137 |
| 5,992,117 A * | 11/1999 | Schmidt | B62D 33/046 |
| | | | 52/584.1 |
| 6,982,021 B2 | 1/2006 | Spengler | |
| 7,104,025 B2 | 9/2006 | Nelson | |
| 8,056,302 B2 * | 11/2011 | Uto | B62D 25/24 |
| | | | 52/794.1 |
| 9,610,759 B2 | 4/2017 | Albertelli | |
| 9,718,257 B2 | 8/2017 | Aeschilmann | |
| 10,322,531 B2 | 6/2019 | Ochoa et al. | |
| 10,961,722 B2 | 3/2021 | Baert et al. | |
| 2002/0106503 A1 | 8/2002 | Monk et al. | |
| 2003/0129361 A1 | 7/2003 | Plug et al. | |
| 2007/0298229 A1 | 12/2007 | Rasmusson et al. | |
| 2008/0166508 A1 | 7/2008 | Edwards | |
| 2008/0258514 A1 | 10/2008 | Nichols et al. | |
| 2010/0297414 A1 | 11/2010 | Brentrup et al. | |
| 2012/0103722 A1 | 5/2012 | Clausi et al. | |
| 2015/0352808 A1 | 12/2015 | Rusby | |

FOREIGN PATENT DOCUMENTS

| | | |
|---|---|---|
| WO | 2012082932 A2 | 6/2012 |
| WO | 2017021566 A1 | 2/2017 |

\* cited by examiner

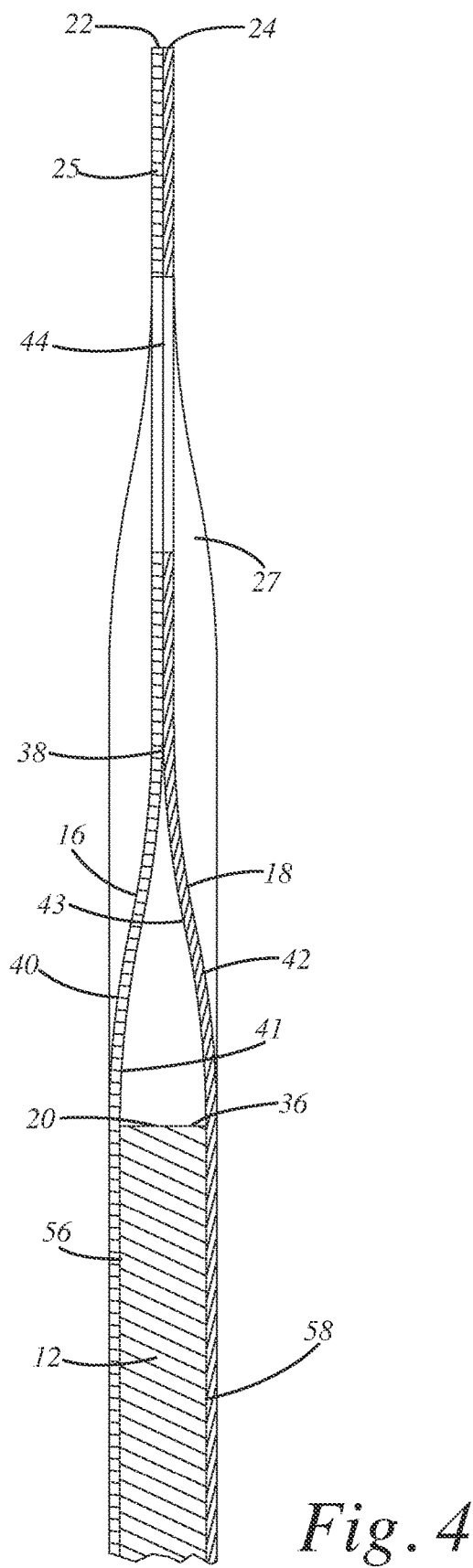
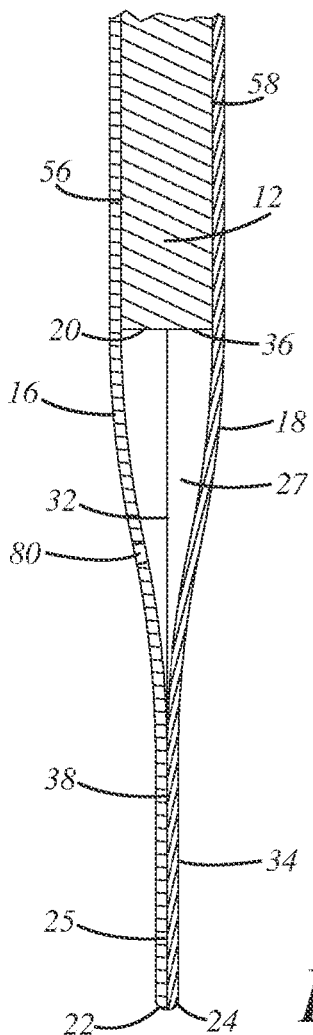
Fig. 4
Fig. 5

STRUCTURAL LAMINATE COMPONENT

BACKGROUND OF THE INVENTION

The present invention relates to structural laminate components, and more particularly to a lightweight, strengthened structural laminate component that can utilize sheet materials for a variety of applications.

Sheet materials, such as high pressure laminates ("HPL's"), low pressure laminates (LPL's), and particle board are well known for a variety of applications, including functional applications such as flooring, markerboards and worksurfaces, and more decorative applications such as privacy panels and upright screens. Each sheet or panel may be provided by an outer layer or "finish" layer that provides a degree of decoration, function or both. For example, in an HPL panel used for flooring, the outermost layer may have a wood grain. In another example, the outer layer may be a "white board" or "dry erase" surface that enables a user to write and erase with designated markers.

In applications such as markerboards and worksurfaces, where the sheet materials have an exposed perimeter edge, it is common to add an edge band extending around the perimeter edge that will cover the edges of the sheet material and provide a "finished" appearance to the perimeter while also providing the edge with an added degree of strength. In some applications two of the sheet materials are laminated to each other or a central core with the finish layers facing in opposite directions to form top and bottom surfaces of the product with an edge band surrounding the exposed edges of both the top and bottom sheets.

Because many of these sheet materials are known for their low cost and high durability, it is desirable to find additional uses and applications. Such applications may require a lightweight component for portability, high strength for adaptability in a variety of situations, and an aesthetically pleasing appearance.

SUMMARY OF THE INVENTION

The present invention provides a structural laminate component that is both strong and lightweight, and useful in a variety of applications including as a whiteboard, a worksurface, shelf, wall tile and a privacy screen.

In one embodiment, the structural laminate component includes a core having an upper surface, a lower surface and a core perimeter edge, a first sheet material panel having a first panel perimeter edge, the first sheet material panel overlying the upper surface of the core, and a second sheet material panel having a second panel perimeter edge, the second sheet material panel overlying the lower surface of the core opposite the first sheet material panel. The first panel perimeter edge and the second panel perimeter edge are coupled together to form an integral frame extending about the first panel perimeter edge and the second panel perimeter edge in an area where the first and second panels are coupled together, wherein the core perimeter edge is spaced inwardly from the integral frame. The integral frame forms a structural and visually appealing perimeter for the component that is unitary with the component and thus does not require further edge banding or strengthening components.

In one embodiment, the first panel and the second panel are spaced apart at a first distance there between in the area overlying the core, and they are directly coupled within the integral frame. The structural laminate component may include a transition section between the core and the integral frame, wherein a distance between the first and second panels gradually decreases from the first distance to the direct coupling of the panels.

The present invention further provides a method of forming a structural laminate component, the method comprising: providing a first panel or sheet having an inner surface, an outer surface and a peripheral edge; providing a second sheet having an inner surface, an outer surface and a peripheral edge; providing a core having first and second opposing surfaces and a core peripheral edge; placing the core between the first and second sheets with the inner surface of the first sheet contacting the first surface of the core, the inner surface of the second sheet contacting the second surface of the core, and with the core peripheral edge spaced inwardly from the outer peripheral edges of the first and second sheets; placing an adhesive between the first and second sheets; and pressing the first sheet and the second sheet toward one another such that the inner surfaces of the first and second sheets, in an area between the core peripheral edge and the outer peripheral edges of the first and second sheets, are adhered directly together to form an integral frame.

In various embodiments, the first and second laminate panels or sheets are formed from a high pressure laminate or "HPL" material. The laminate panels may be provided with a variety of surfaces, such as a markerboard or "dry erase" surface, a wood grain surface, or a variety of other decorative or functional surfaces. In another embodiment, at least one of the panels may be made from another sheet material, such as a veneer, a low pressure laminate, thin plywood, hardboard or the like. The core is generally formed of a lightweight material such as, but not limited to, expanded polystyrene, wood, particle board, hardboard, HDF, MDF, or LDF. The panels are pressed together around their panel edges to form an integral frame. The resulting worksurface has a central portion that is thicker and an integral frame portion that is thinner relative to the central portion and provides additional strength without the expense and weight of a separate edge band or perimeter frame.

The thickness of the integral frame relative its proximity to the edge of the panels provides the desired aesthetic appearance of the structural laminate component with the central portion exhibiting a flat surface that can act as a writing surface, a worksurface or a barrier, which extends with a smooth transition to the integral frame. The panels may be coupled with adhesive, and, in the area of the integral frame the two panels are held directly together with an adhesive, creating a high strength, high stiffness frame. Non-limiting examples of suitable adhesives include an epoxy-based adhesive, a urethane based adhesive, and other generally faster curing adhesives.

These and other objects, advantages, and features of the invention will be more fully understood and appreciated by reference to the description of the current aspects and the drawings.

Before the aspects of the invention are explained in detail, it is to be understood that the invention is not limited to the details of operation or to the details of construction and the arrangement of the components set forth in the following description or illustrated in the drawings. The invention may be implemented in various other aspects and may be practiced or may be carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various aspects. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 is a cross-sectional side view of the portion of the structural laminate component detailed in circle IV in FIG. 3.

FIG. 5 is a cross-sectional side view of the portion of the structural laminate component detailed in circle V in FIG. 3.

DETAILED DESCRIPTION OF THE CURRENT EMBODIMENT

Figure 1:
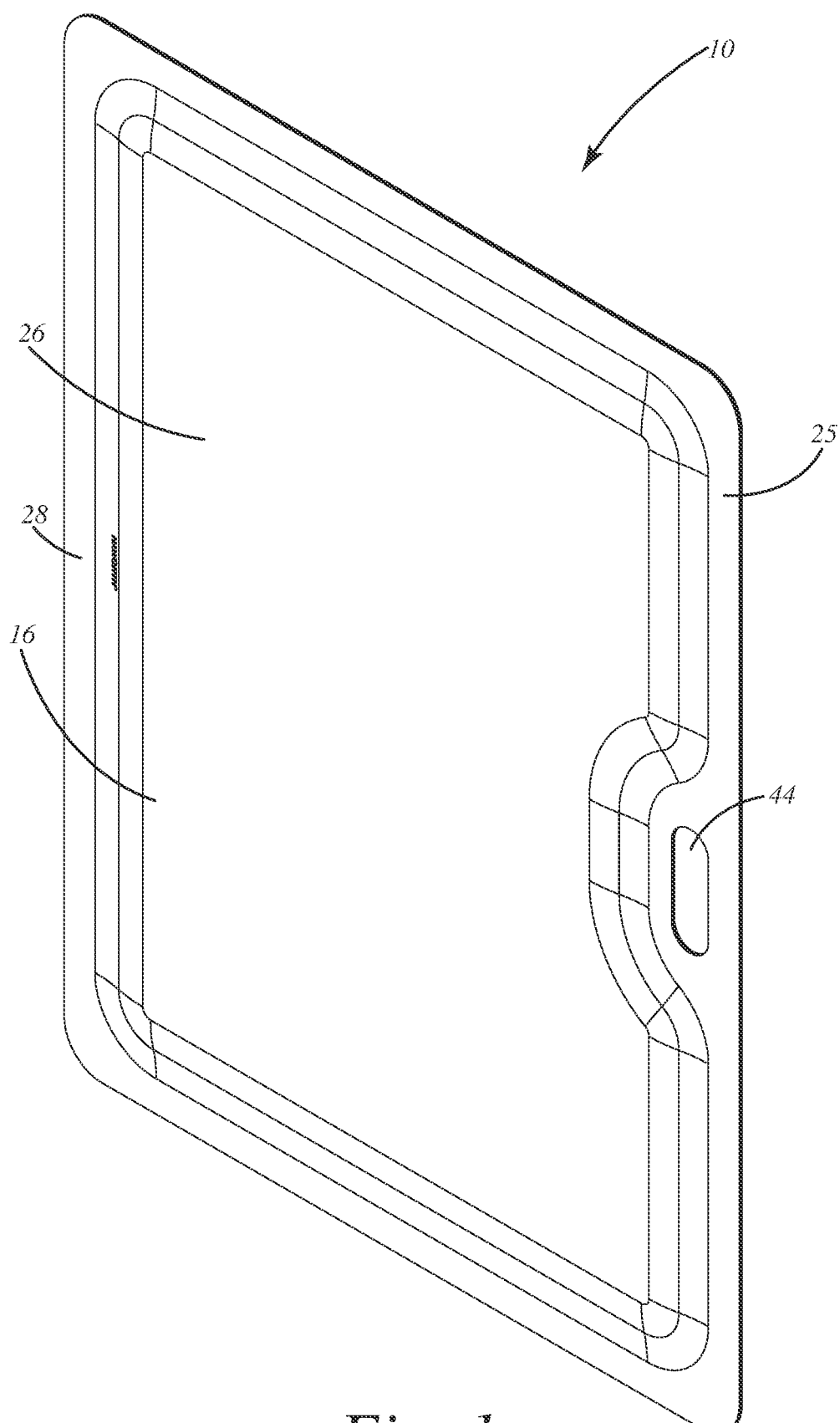
FIG. 1 is a view of a structural laminate component according to one embodiment of the present invention.

Referring to the Figures, a structural laminate component is shown in accordance with one embodiment of the present invention and generally designated 10. The structural laminate component 10 includes a core 12, a first sheet or panel 16 overlying the core 12 and a second panel 18, opposite the first panel 16, overlying the core 12 and generally sandwiching the core 12 therebetween. The core has a core peripheral edge 20 extending around the perimeter of the core 12. The first panel 16 has a first panel peripheral edge 22 extending around the perimeter of the first panel 16, and the second panel 18 has a second panel peripheral edge 24 extending around the perimeter of the second panel 18. The core peripheral edge 20 is spaced inwardly from the first panel edge 22 and the second panel edge 24, and a portion of the first panel 16 and second panel 18 are coupled together in an area between the core peripheral edge 20 and the first and second panel peripheral edges 22, 24 to form an integral frame portion 25 of the structural laminate component 10 to provide the structural laminate component 10 with improved structural integrity. The structural laminate component 10 can be used in a variety of applications for providing a structural panel, such as a white board, a worksurface, a wall panel, a shelf and a privacy screen.

With particular reference to FIGS. 1-5, the structural laminate component 10 generally includes a central portion 26 and a border portion 28 with the central portion 26 extending to the border portion 28. The central portion 26 includes an area in which the first 16 and second 18 panels overlay the core 12, and the border portion generally includes an area in which the panels 16, 18 extend beyond the peripheral core edge 20. In various embodiments, the central portion 26 has a generally rectangular configuration including four sides with the border portion 28 flanking all four sides of the central portion 26. In various embodiments, the border portion 28 includes a transition section 27 and an integral frame 25. The transition section 27 has a tapered configuration which decreases in thickness as the border portion 28 extends from the central portion 26 to the integral frame 25. The integral frame 25 generally extends from the transition section 27 to the peripheral edges 22, 24 of the respective panels 16, 18 in the area in which the panels 16, 18 are coupled together as described in more detail below. In these and other embodiments, the first panel edge 22 extending about the perimeter of the first panel 16 and the second panel edge 24 extending about the perimeter of the second panel 18 may be coterminous, with both panels 16, 18 having the same size and shape, although in another embodiment one of the panels may include a portion that extends beyond the edge of the other panel.

Figure 3:
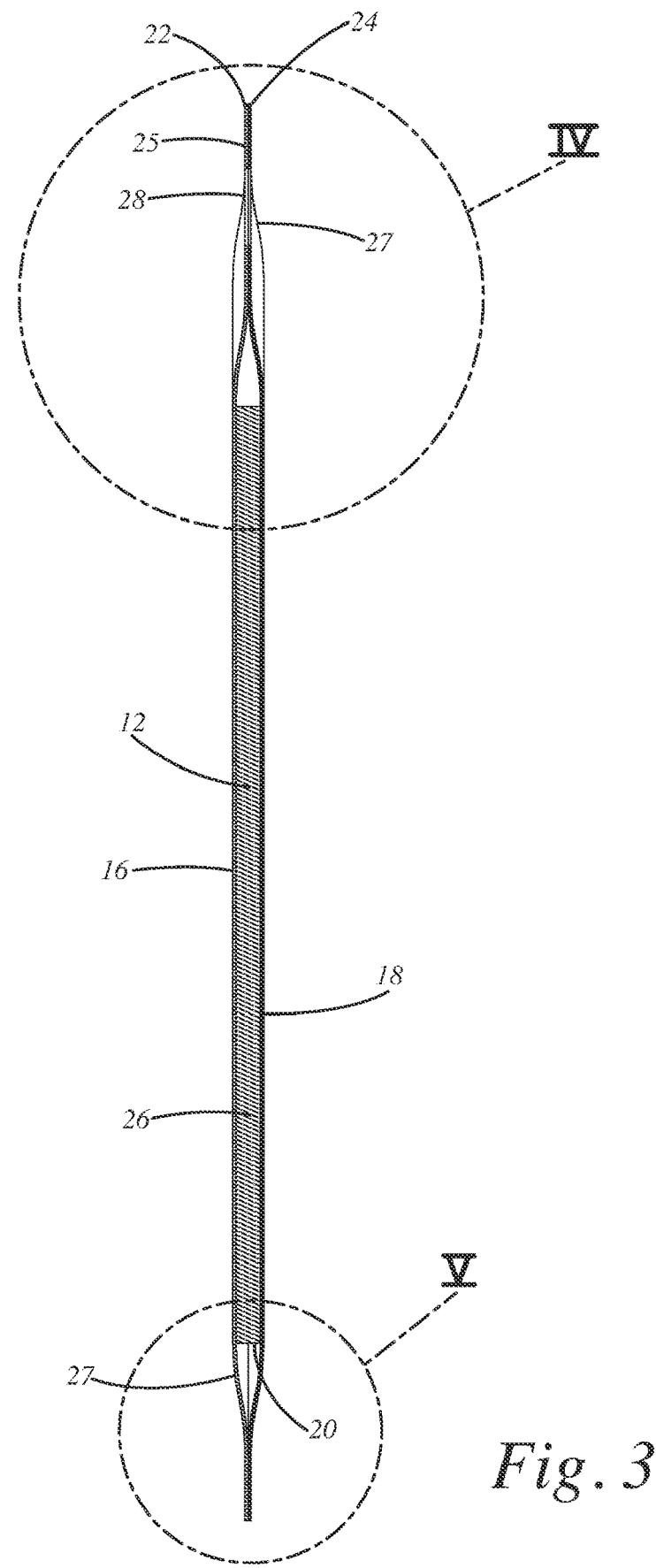
FIG. 3 is cross-sectional side view of an embodiment of the structural laminate component of FIG. 1.
Figure 6:
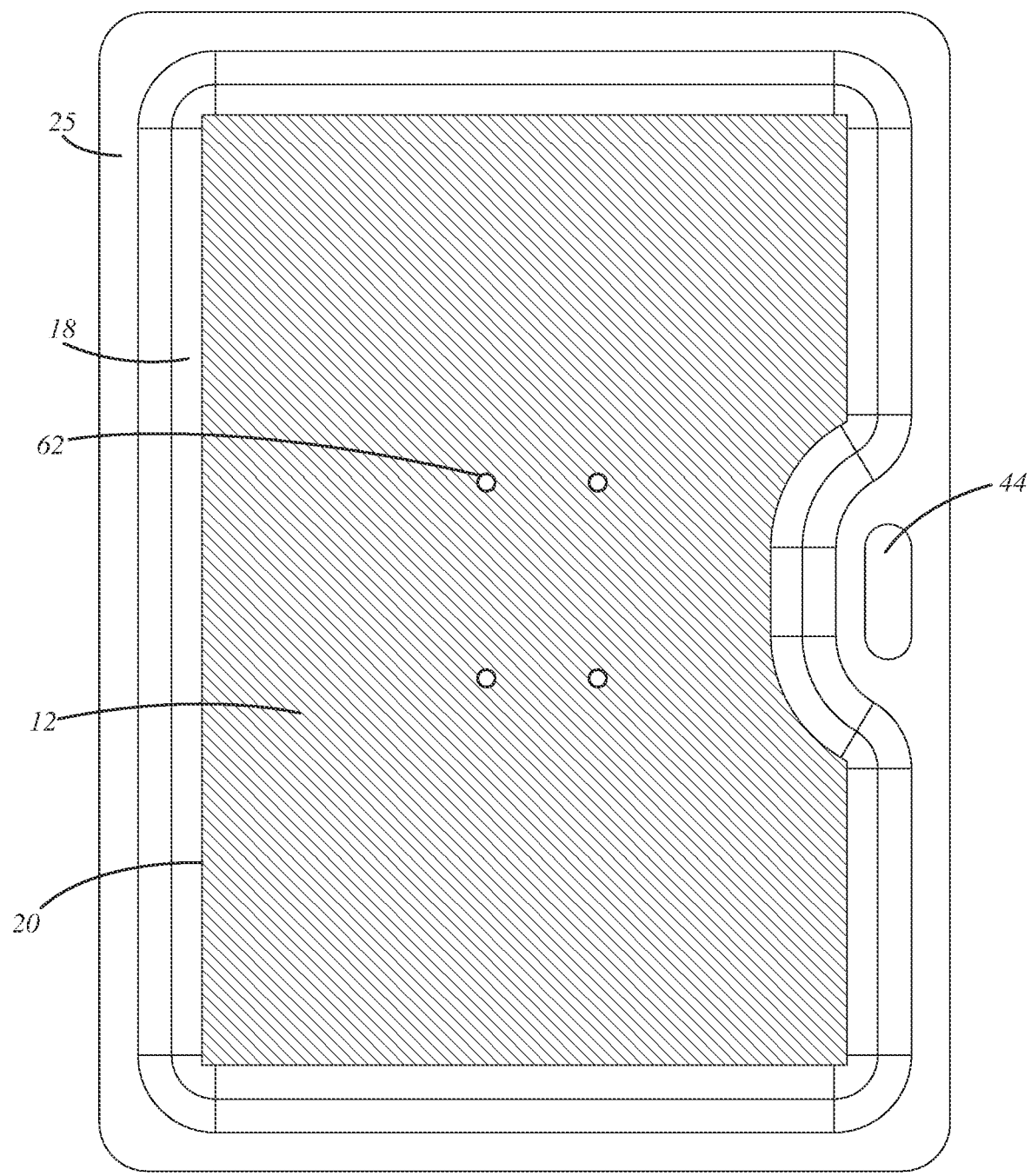
FIG. 6 is a sectioned top view of the structural laminate component illustrating the positioning of the core and functional inserts.
Figure 7:
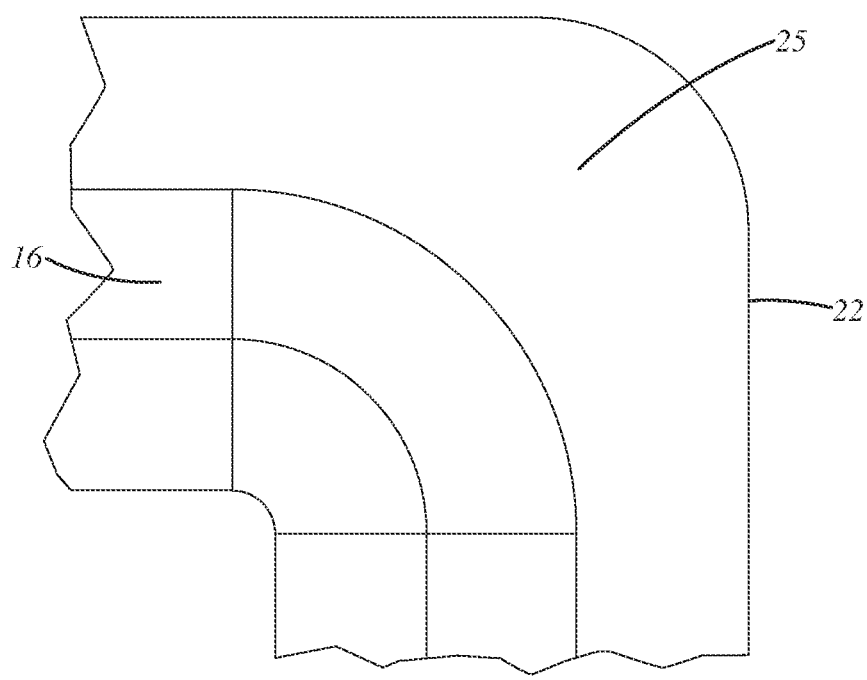
FIG. 7 is a top view of the portion of the structural laminate component detailed in circle VII in FIG. 2.

With particular reference to FIGS. 3-5, the first panel 16 includes an outer surface 40 and an inner surface 41 opposite the outer surface 40. The second panel 18 includes an outer surface 42 and an inner surface 43, with the respective outer surfaces 40, 42 forming the "finish" surfaces that are exposed to the environment. In one embodiment, the first and second laminate panels 16, 18 are each formed from a high pressure laminate material or "HPL." HPL is commonly produced by saturating multiple layers of a substrate such as paperboard, particle board or kraft paper with phenolic resin, with a "finish" layer provided on top of the kraft paper before pressing. The resulting sandwich is fused together under heat and pressure. Because the resins are thermoset plastics, the curing process transforms the resin into plastic by a cross linking process that converts the layers into a single, rigid laminated sheet. In another embodiment, at least one of the panels may be made from another type of sheet material, such as a veneer, a low pressure laminate, thin plywood, hardboard or the like. In addition, one or both of the panels may be a pre-laminated panel, wherein a material such as fabric or leather is laminated to the outer surface 40, 42 of one or both of the panels 16, 18 prior to final assembly of the structural laminate component 10. And in another embodiment, a backer material could be applied to at least a portion of one or both of the inner surfaces 41, 43 prior to assembly of the component 10. The panels 16, 18 have a thickness defined between the respective outer surfaces 40, 42 and the respective inner surfaces 41, 43. The panel thickness may vary depending on the application, but in one embodiment is between about 0.023 inches and 0.1875 inches, and in a more particular embodiment the panel thickness is 0.047+/−0.005 inches.

In various embodiments, the outer or "finish" layer of the panel surfaces 40, 42 may be configured to provide a variety of surface features, including both functional and decorative, in a variety of combinations. Non-limiting examples of suitable surface features include a writable surface (e.g. a Melamine paper dry-erase or other "white board" surface), a surface including a reusable adhesive, a clear film cover over a tackable surface, and a supportive worksurface (e.g. formed from a wood grain or the like).

It is to be appreciated that the structural laminate component 10 may further include an adhesive applied between the first panel 16 and the second panel 18 for adhering the first panel 16 and the second panel 18. In one embodiment, the adhesive (not illustrated) is applied in a layer covering the entire inner surface 41 of the first laminate panel 16 and on the entire inner surface 43 of the second laminate panel 18, and the two panels 16, 18 are then pressed together about the core 12. In another embodiment, the adhesive is applied only to one or both panels in the border region 28. Non-limiting examples of suitable adhesives include an epoxy-based adhesive, a urethane-based adhesive, and other generally faster curing adhesives. In one embodiment the adhesive is a one-component polyurethane reactive hot melt adhesive.

In certain embodiments, the structural laminate component 10 has a taper length 32, also referred to as a transition section length 32, measured from the perimeter edge 20 of the core 12 to the integral frame 25 (i.e., the distance from the core perimeter edge 20 to the location at which the inner surfaces 41, 43 of the panels 16, 18 contact each other and are coupled together). The taper length 32 may be predetermined depending on the desired size and application for the structural laminate component 10 and depending on the height of the core 12 and the width of the border region 28. In one embodiment, the taper length 32 may be in an amount of from approximately 0.5 inches to approximately 3 inches, and in a more specific embodiment may be about 1.75 inches. In various embodiments, the integral frame 25 has an integral frame length 34 extending from the transition section 27 to the peripheral edges 22, 24 of the first and second panels 16, 18. The integral frame length 34 may be in an amount of from approximately 0.25 inches to approximately 4 inches, and in one specific embodiment is about 1 inch. The integral frame length 34 and the taper length 32 may be in a ratio of from approximately 4:1 to approximately 1:4, and in the illustrated embodiment is about 1:1.75. In addition, the panel thickness to taper length 32 may be in a ratio of about 1:3 to about 1:55, and in one embodiment is about 1:37. Variations of these ratios may impact the strength and structure of the structural laminate component 10, and can be altered depending on the desired application.

With continuing reference to FIGS. 3-5 and 9, the core 12 may have a first core surface 56 and a second core surface 58 opposite the first core surface 56. The core 12 further includes a core thickness defined between the first core surface 56 and the second core surface 58. In one embodiment the core thickness is predetermined based on a desired thickness of the structural laminate component 10, and a desired degree of taper within the transition section 27. In one embodiment, the core 12 has a thickness of about 0.1875 inches to about 3 inches, and in the illustrated embodiment, the core has a thickness of about 0.375 inches. The ratio of the core thickness to taper length 32 defines the rate at which the component 10 transitions from the first thickness 36 to the second thickness 38. In one embodiment, the ratio of core thickness to taper length 32 is about 1:1 to 1:10 and in a more specific embodiment is about 1:5. The smaller ratio of about 1:1 generally requires a thinner sheet material for one or both of the panels, and greater adhesion to maintain the bond within the integral frame 25, whereas a larger ratio enables the use of stiffer, thicker sheet materials for one or both of the panels, and is not as reliant on the strength of the bond between the panels (i.e., can utilize less adhesive or a wider variety of adhesive).

The core 12 may be formed from a variety of materials, and in one embodiment is formed from a lightweight material as a means of providing space between the two panels 16, 18 while enabling the coupling of the panels 16, 18 in the area of the integral frame 25. In one embodiment, the core 12 is formed from an expanded polystyrene material, and in another embodiment the core 12 is formed from another polymeric material, such as a polyurethane foam. However, it is to be appreciated that the core 12 may be formed from other materials including wood, balsa wood, carbon, fiberglass filled carbon, particle board, aluminum particle board, HDF, MDF, LDF, hardboard or another sheet material product.

Figure 10:
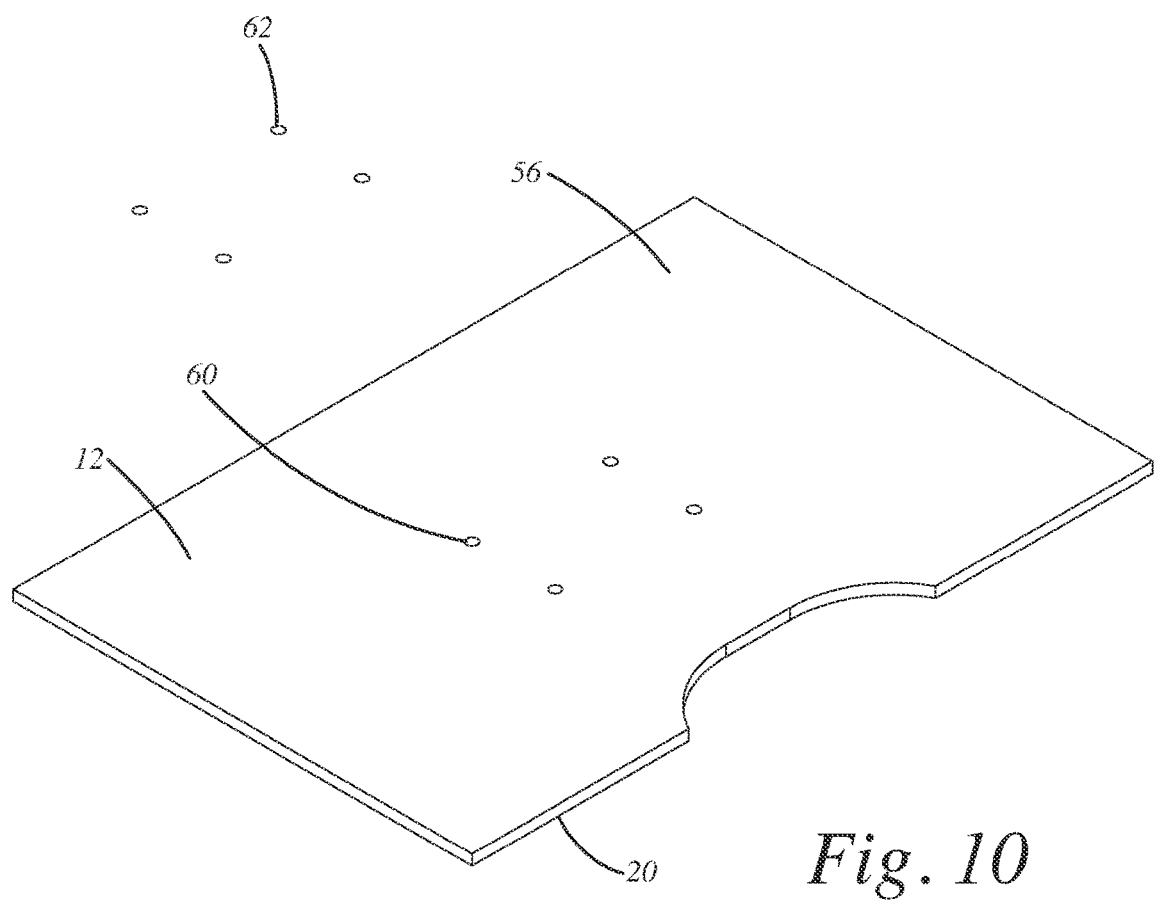
FIG. 10 is a perspective view of a core and functional elements according to another embodiment.
Figure 11:
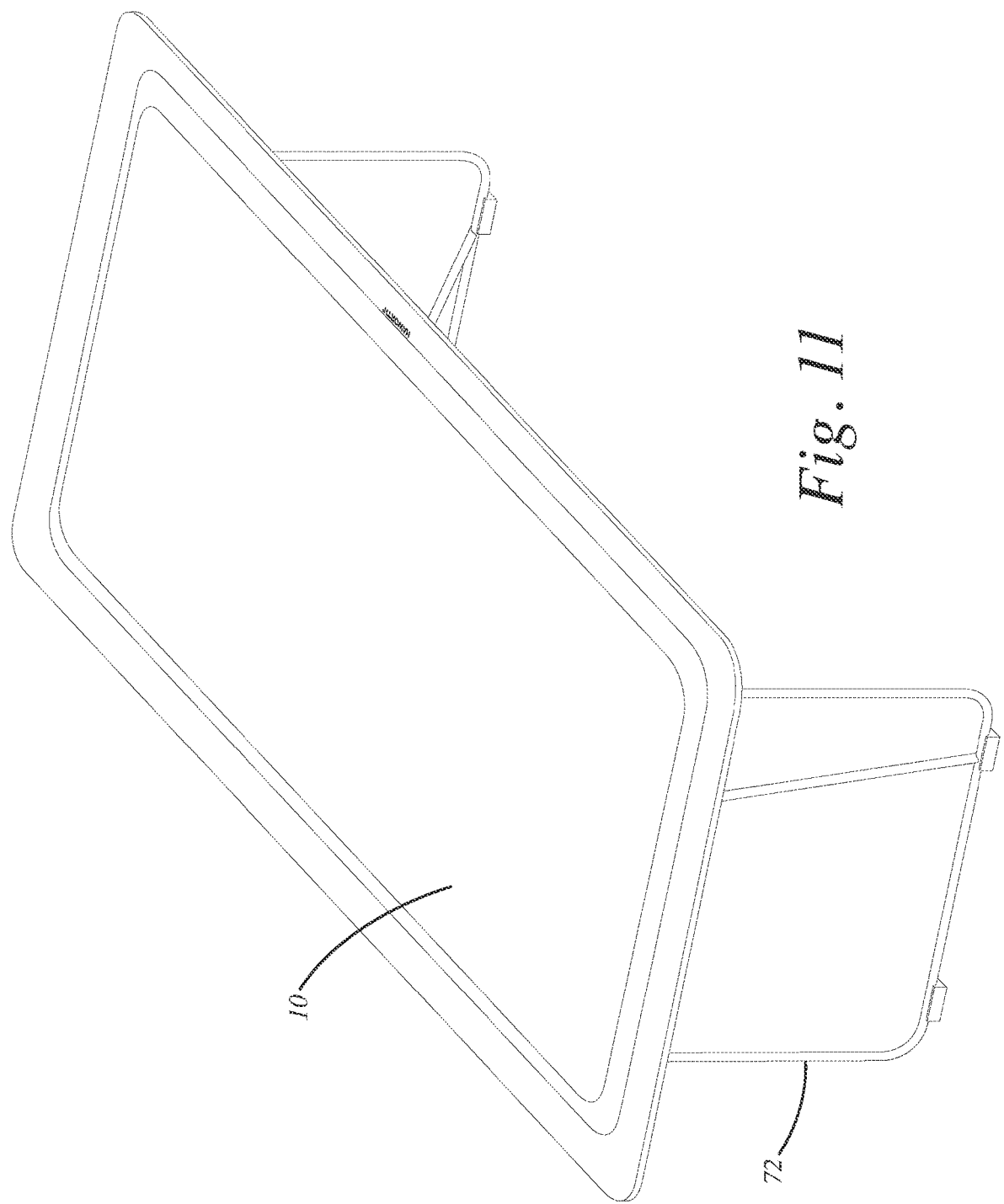
FIG. 11 is a perspective view of a structural laminate component in a worksurface application.
Figure 12:
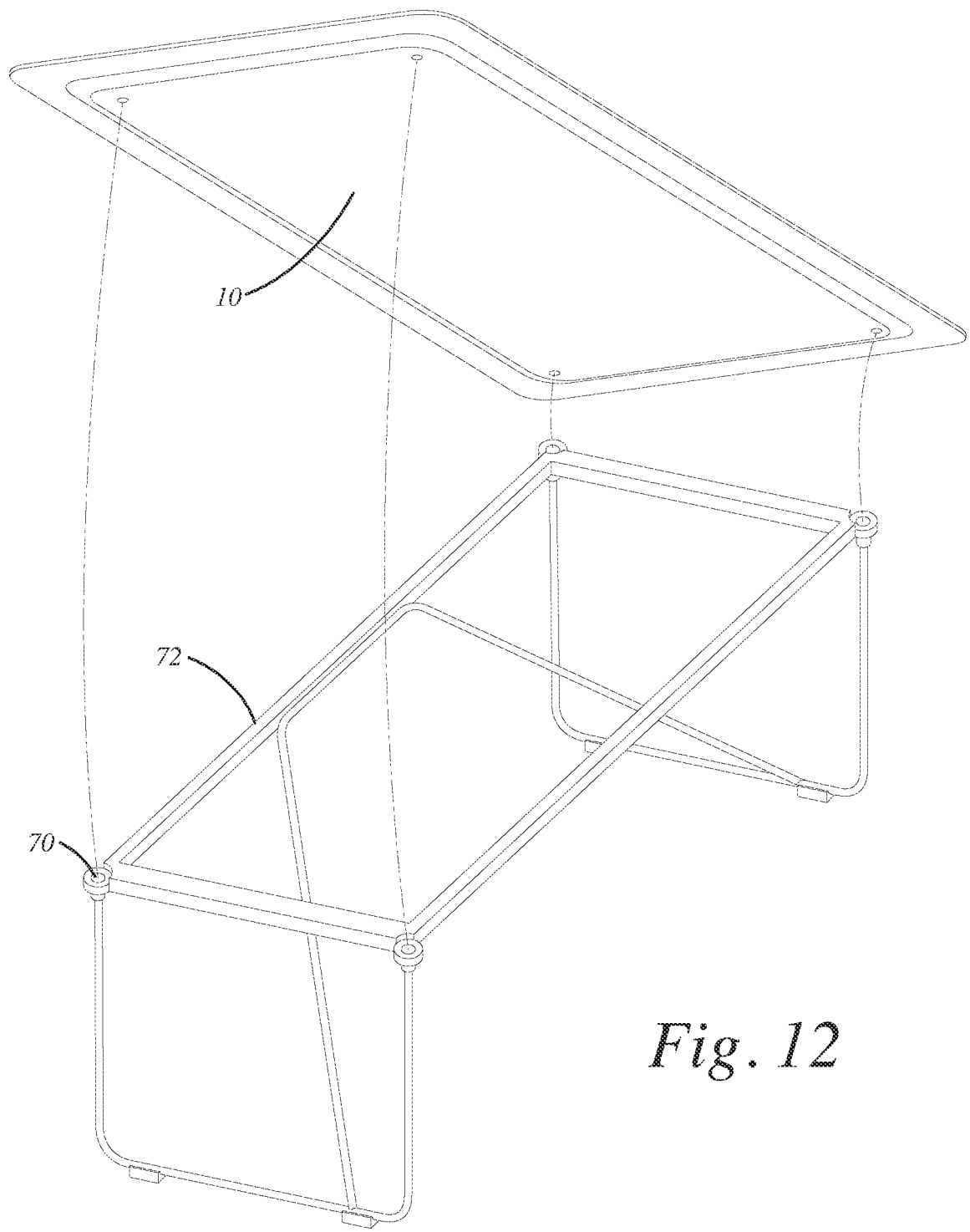
FIG. 12 is a perspective view of a structural laminate component in a worksurface application showing the worksurface support.

In one embodiment, shown in FIG. 10, the core 12 may define a void 60, or a series of voids 60 in the first core surface 56 or the second core surface 58. In some embodiments, the void 60 only partially extends through the first core surface 56, the second core surface 58, or both. In other embodiments, the void 60 extends completely through the core 12 through the first core surface 56 and the second core surface 58. In various embodiments, the structural laminate component 10 further includes a functional insert 62 that may enable the attachment of the structural laminate component 10 to a support or a substrate. For example, in one embodiment the functional insert may include one or more magnets disposed within the void(s) 60 of the core 12. The magnets may allow the structural laminate component 10 to magnetically couple to various types of supports, such as an easel. In another embodiment, one or more of the functional inserts 62 positioned in one or more of the voids 60 a threaded screw boss or other receptacle for a mechanical fastener. In an embodiment wherein the structural laminate component 10 is used for a worksurface application, such as shown in FIGS. 11 and 12, the screw bosses may be positioned within the core 12 to align with fastener locations 70 on a structural support 72 to enable fastening of the structural laminate component 10 to the structural support 72 via fasteners (not shown) extending through the fastener locations 70 and into the functional inserts 62.

With reference to FIGS. 3-5, in various embodiments, the first panel 16 and the second panel 18 may define a first thickness 36 therebetween in the central region 26 overlying the core 12. The first thickness 36 may be in an amount of from approximately 0.1875 inches to approximately 3 inches, and in one embodiment is about 0.5. The first panel 16 and the second panel 18 may further define a second thickness 38 therebetween, different than the first thickness 36, spaced from the core 12, and adjacent to the first panel edge 22 and the second panel edge 24. The second thickness 38 is generally minimal, as the first 16 and second 18 panels are generally directly coupled in the area of the integral frame 25 or coupled via a material such as a backer material of minimal thickness. The thickness 36 tapers in the transition section 27 from the first thickness 36 to the second thickness 38.

Figure 2:
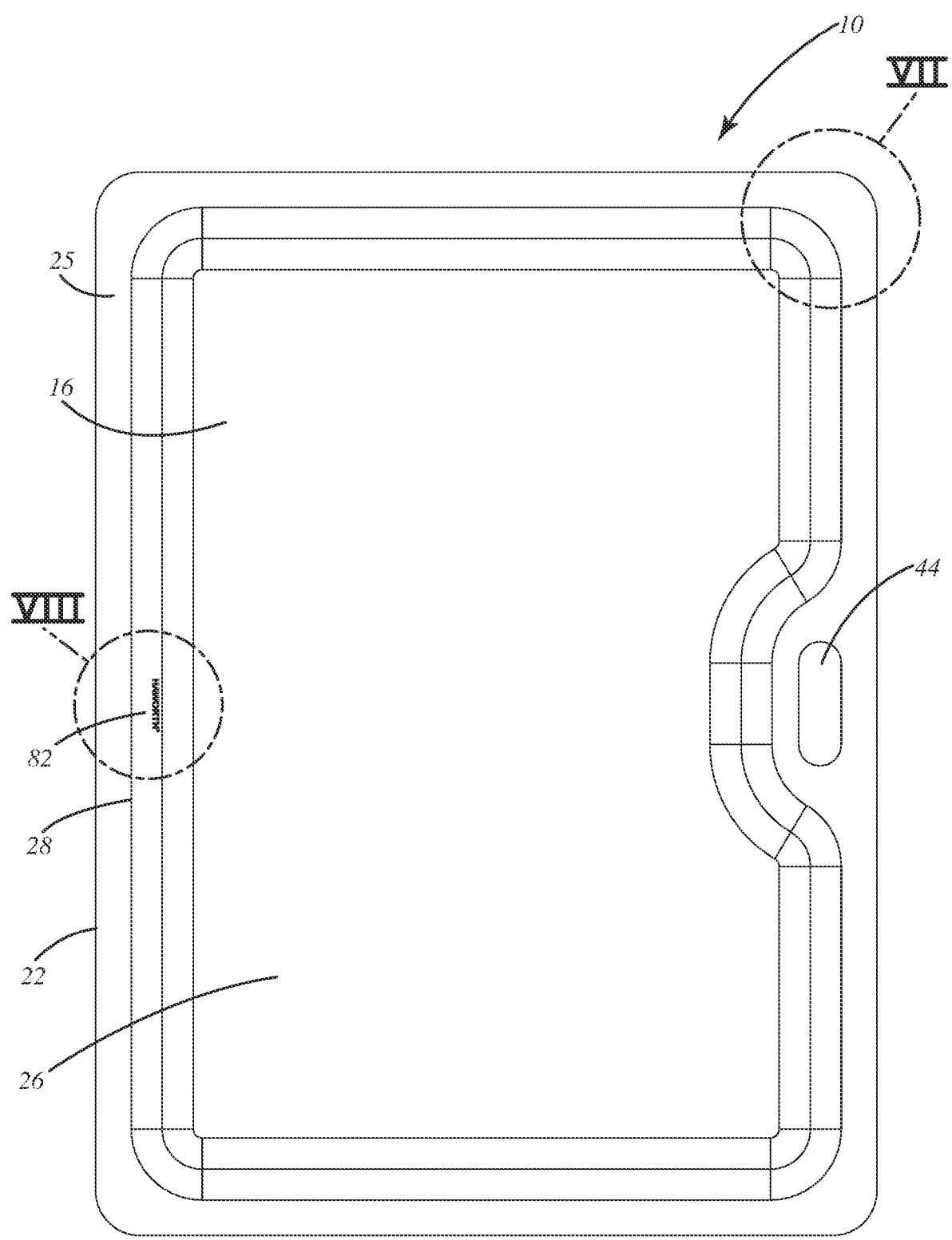
FIG. 2 is a top view of an embodiment of the structural laminate component of FIG. 1.

In various embodiments, the structural laminate component 10 defines a handle space 44 extending through the first panel 16 and the second panel 18 for improving the portability of the structural laminate component 10. With reference to FIG. 2, in one embodiment the handle 44 is a cutout formed within the integral frame 25 portion of the component 10. More particularly, the handle 44 is a cutout formed in the area in which the panels 16, 18 are coupled directly together with adhesive. In the illustrated embodiment, the width of the integral frame 25 varies to accommodate the handle 44. As shown, the integral frame portion 25 extends completely around the handle 44 such that the handle 44 is disposed within the integral frame 25. The width of the integral frame 25 between the handle 44 and the peripheral edges 22, 24 may remain constant around the entire periphery of the component 10 (as illustrated, about 1 inch), but the integral frame 44 may also extend between the handle 44 and the transition section 27 to accommodate the width of the handle 44. In one embodiment, the handle 44 has a width of about 1 inch in the lateral direction, and the integral frame 25 has a width of about 0.75 inches in the area between the handle 44 and the transition section 27. Other shapes and sizes of cutouts for handles or other functions may be provided in the integral frame 25 in a similar manner, and in one embodiment one or more cutouts may be formed in the transition section 27 or the central section 26, extending through one or both panels 16, 18 or the core 12.

Figure 8:
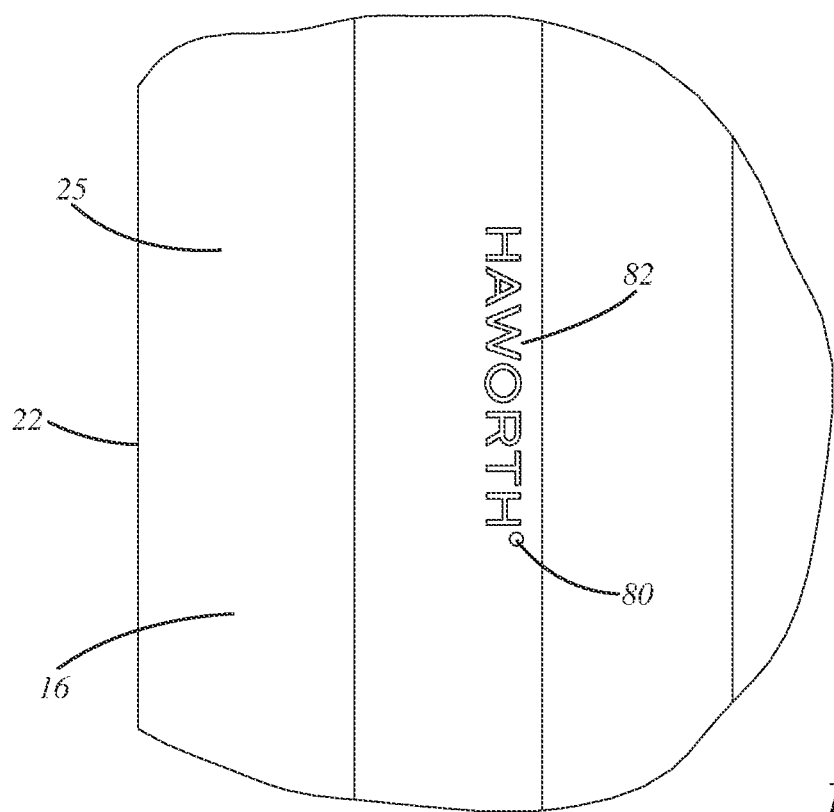
FIG. 8 is a top view of the portion of the structural laminate component detailed in circle VIII in FIG. 2.
Figure 9:
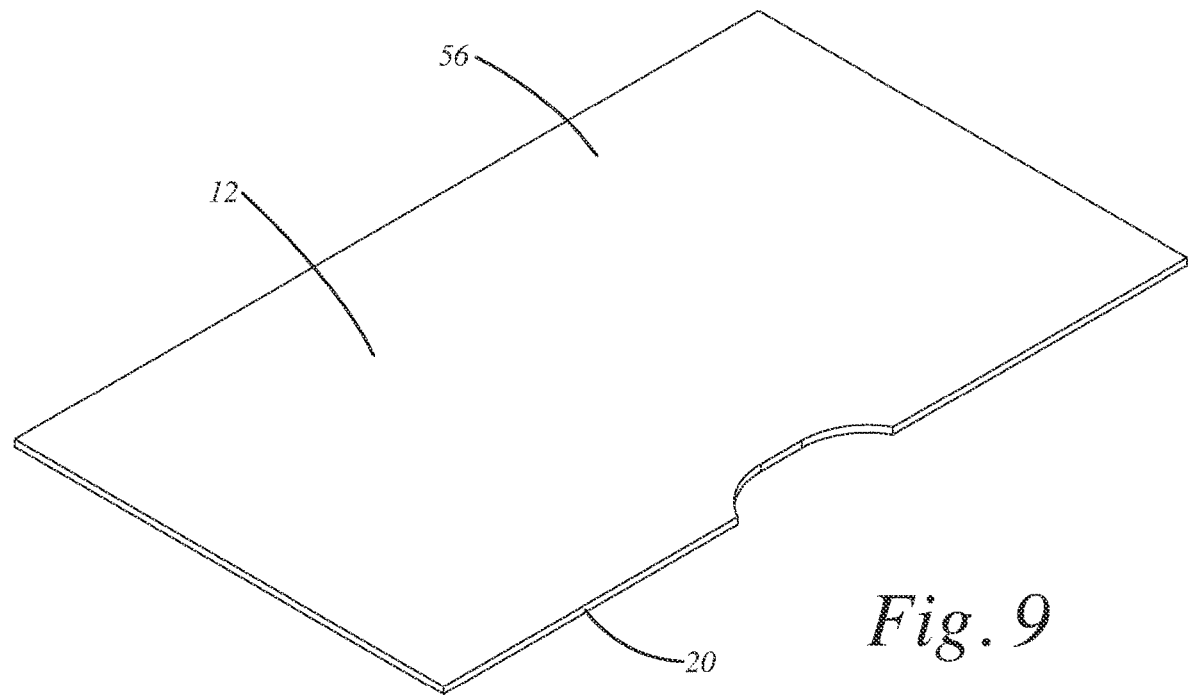
FIG. 9 is a perspective exploded view of a core according to one embodiment.

Referring now to FIGS. 5 and 8, in another embodiment, the structural laminate component 10 defines a vent 80. The vent 80 may be a small hole that extends through one or both of the panels 16, 18 to allow the escape of gases that may build up inside the component 10 over time due to the manufacturing process and/or the materials used for the HPL panels, the adhesive, and other factors such as temperature or pressure changes. In one embodiment, the vent 80 extends through the first panel 16 in the border region 28, and specifically in the transition section 27 such that the vent 80 aligns with the generally hollow internal space within the component 10 between the core 12 and the integral frame 25. As in the embodiment shown in FIG. 8, the vent 80 may be positioned adjacent to printed material such as text or a logo 82 to conceal the existence of the vent 80. In another embodiment, the vent may be another opening or passageway to enable the escape of internal gases, such as an opening at the perimeter of the component providing a passage between the panels.

Figure 13:
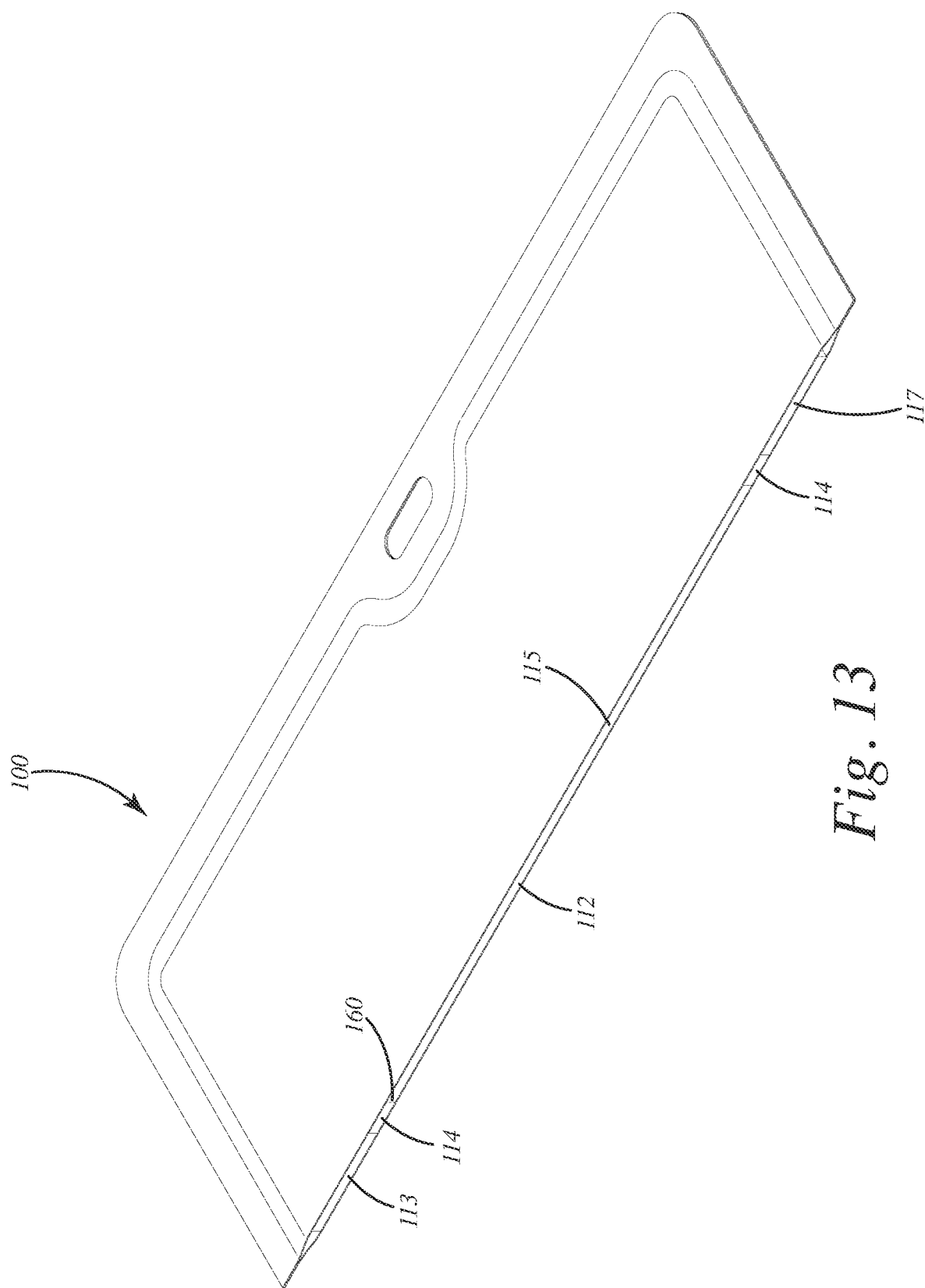
FIG. 13 is a sectional view of a structural laminate component according to an embodiment including attachment strips.
Figure 14:
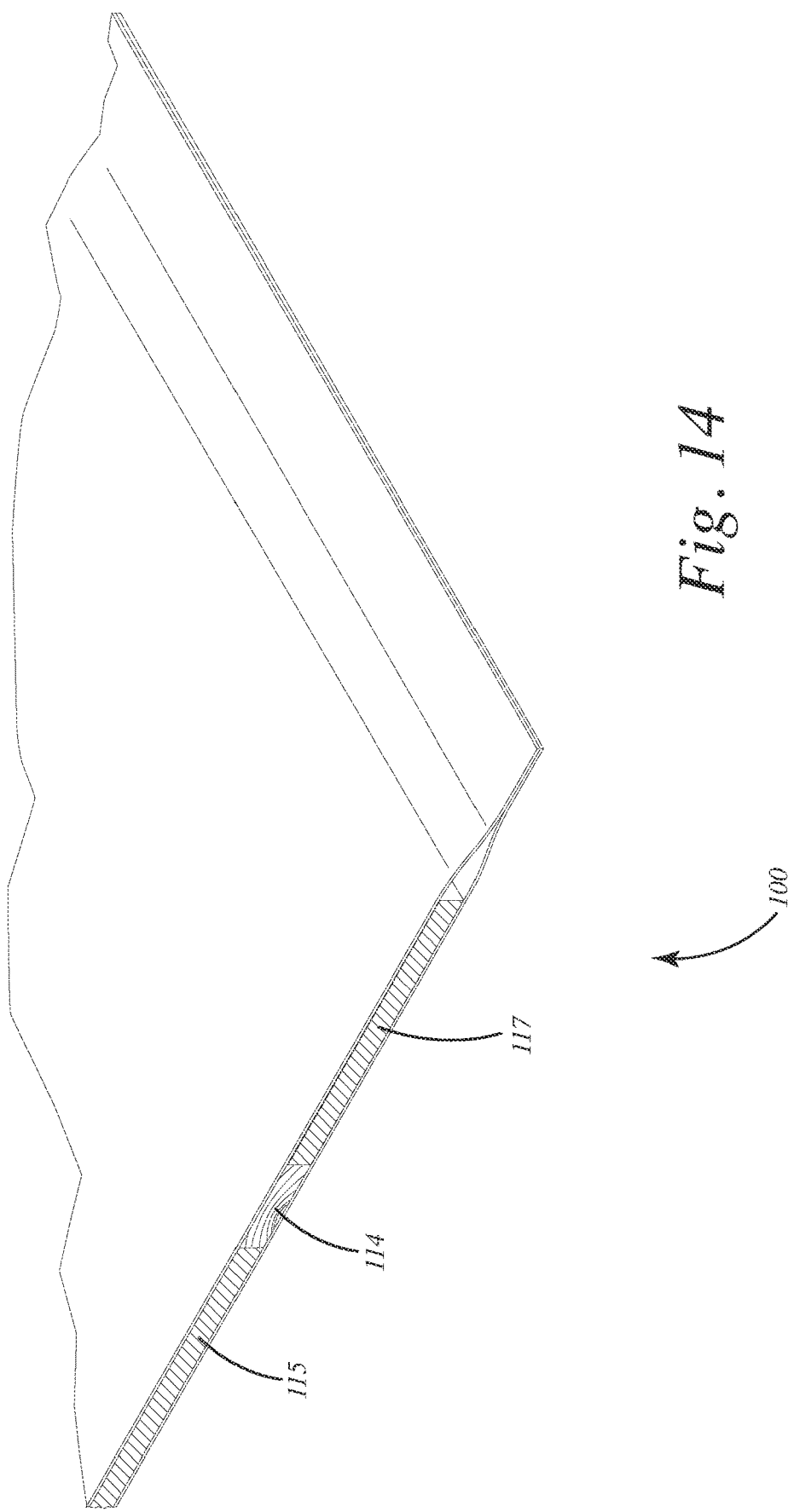
FIG. 14 is a close up view thereof.
Figure 15:
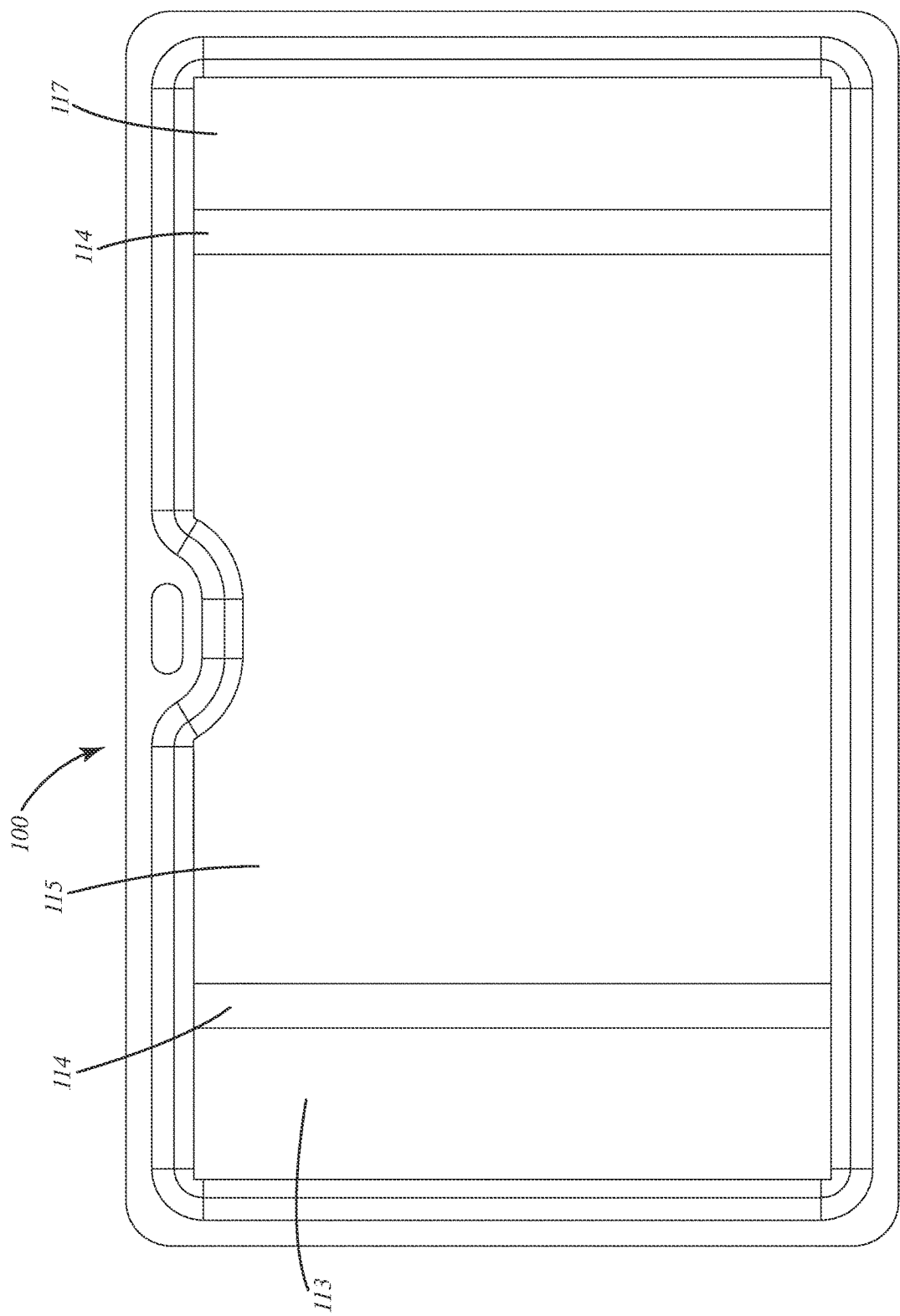
FIG. 15 is a top view thereof with a one of the sheets removed.

FIGS. 13-15 show a structural laminate component 100 wherein the core 112 defines insert voids 160 that extend across the core 112 such that the core 112 is intermittent, and divided with functional inserts in the form of attachment strips 114 of an attachment material such as wood or another material capable of receiving and retaining fasteners such as screws. In this embodiment, the core 112 is divided into three sections 113, 115 and 117, with a first strip 114 extending between sections 113 and 115 and a second strip 114 extending between sections 115 and 117. This alternate core 112 may be utilized, for example, with the embodiment shown in FIGS. 11 and 12, wherein the functional inserts 62 are replaced by the strips 114 and fasteners for use with the fastener locations 70 on the structural support 72 extend into the strips 114 to enable fastening of the structural laminate component 112 to the structural support 72. The strips 114 may be easier to locate and receive attachment than the smaller functional inserts. In yet another embodiment, the strips 114 could be a different size and shape and may not extend completely across the core 112 as they are depicted in FIGS. 13-15. The size and shape of the strips 114 can be adapted for any type of attachment depending on the desired application for the structural laminate component 100.

The present invention also provides a method of forming a structural laminate component 10. The method includes the steps of: providing a first sheet material, such as a high pressure laminate panel or sheet 16 having an inner surface 41, an outer surface 40 and a peripheral edge 22; providing a second sheet material, such as a high pressure laminate panel 18 having an inner surface 43, an outer surface 42 and a peripheral edge 24; providing a core 12 having first and second opposing surfaces 56,58 and a core peripheral edge 20; placing the core 12 between the first 16 and second 18 high pressure laminate panels with the inner surface 41 of the first high pressure laminate panel 16 contacting the first surface 56 of the core, the inner surface 43 of the second high pressure laminate panel 18 contacting the second surface 58 of the core 12, and with the core peripheral edge 20 spaced inwardly from the outer peripheral edges 22, 24 of the first and second panels 16, 18; placing an adhesive between the first and second panels 16, 18; and pressing the first panel 16 and the second panel 18 toward one another such that the inner surfaces 41, 43 of the first and second panels 16, 18, in an area between the core peripheral edge 20 and the outer peripheral edges 22, 24 of the first and second panels 16, 18, are adhered directly together to form an integral frame 25.

In one embodiment, the method includes applying the polyurethane adhesive to the inner surfaces 41, 43, of each HPL panel 16, 18, then placing an expanded polystyrene core 12 in position on one of the panels 16, 18, and then positioning the other of the panels 16, 18 on top of the core 12 with the peripheral edge 22 of the first panel 16 aligned and coterminous with the peripheral edge 24 of the second sheet 18. After the panels 16, 18 and core 12 are in position, they are pressed in a press or mold machine in a manner wherein the integral frame 25 is formed by pressing the area adjacent to the peripheral edges 22, 24 of the panels 16, 18 together such that the adhesive directly adheres the panels 16, 18 together in the area of the integral frame 25. The central region 26 may also be pressed in such a manner that the panels 16, 18 adhere to the core 12 in the central region 26. The press may incorporate a degree of heat, and the panels 16, 18 may be held in the press for a predetermined time period sufficient to form a cross-linked bond between the two panels 16, 18. At the same or a different time in the process, a cut operation may be used to cut the peripheral edges 22, 24 to a desired shape, cut the handle 44 cutout, and punch or otherwise form the vent hole 80.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Features of various embodiments may be used in combination with features from other embodiments. Directional terms, such as "vertical," "horizontal," "top,"

"bottom," "front," "rear," "upper," "lower," "inner," "inwardly," "outer," "outwardly," "forward," and "rearward" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the" or "said," is not to be construed as limiting the element to the singular.

The embodiments of the invention in which an exclusive property or privilege is claimed are defined as follows:

1. A structural laminate component comprising;
a core having an upper surface, a lower surface and a core perimeter edge;
a first panel formed of a cured, rigid sheet material, the first panel having a first panel perimeter edge, the first panel overlying the upper surface of the core; and
a second panel formed of a cured, rigid sheet material, the second panel having a second panel perimeter edge, the second panel overlying the lower surface of the core opposite the first panel, the first panel perimeter edge and the second panel perimeter edge coupled together to form an integral frame extending about the first panel perimeter edge and the second panel perimeter edge in an area where the first and second panels are coupled together;
wherein the core perimeter edge is spaced inwardly from the integral frame, the integral frame extending continuously around the entire core perimeter edge, the first and second panels each having an inner surface, wherein the inner surfaces of the first and second panels are bonded directly to one another and aligned with each other within the entire area of the integral frame extending to the first panel perimeter edge and to the second panel perimeter edge, creating a structural frame.

2. The structural laminate component according to claim 1 wherein the first panel and the second panel are spaced apart at a first distance therebetween in the area overlying the core, and wherein the first panel and the second panel are directly coupled with an adhesive within the integral frame.

3. The structural laminate component of claim 2 including a transition section between the core and the integral frame, the transition section defining a transition section length extending between the core and the integral frame, wherein within the transition section, a distance between the first and second panels gradually decreases from the first distance to the direct coupling of the panels.

4. The structural laminate component of claim 3 wherein the core defines a core thickness, and wherein the ratio of the core thickness to the transition section length is between about 1:1 and 1:10.

5. The structural laminate component of claim 3 wherein at least one of the first and second panels defines a panel thickness, and wherein the ratio of the panel thickness to the transition section length is between about 1:3 and 1:55.

6. The structural laminate component of claim 3 wherein the ratio of the frame length to the transition section length is between about 4:1 and 1:4.

7. The structural laminate component of claim 1 wherein the structural laminate component defines an open cutout extending through the at least one of first panel and the second panel, the first and second panels not adhered or otherwise joined together within the cutout.

8. The structural laminate component of claim 7 wherein the cutout is a handle cutout positioned within the integral frame.

9. The structural laminate component of claim 8 wherein the core defines at least one insert void extending through the core and forming an opening in the core, and wherein a functional insert is disposed in the at least one insert void.

10. A structural laminate component comprising;
a core having an upper surface, a lower surface and a core perimeter edge;
a first panel formed of a sheet material, the first panel having a first panel perimeter edge, the first panel overlying the upper surface of the core; and
a second panel formed of a sheet material, the second panel having a second panel perimeter edge, the second panel overlying the lower surface of the core opposite the first panel, the first panel perimeter edge and the second panel perimeter edge coupled together to form an integral frame extending about the first panel perimeter edge and the second panel perimeter edge in an area where the first and second panels are coupled together;
wherein the core perimeter edge is spaced inwardly from the integral frame, the integral frame extending continuously around the entire core perimeter edge, the first and second panels each having an inner surface, wherein the inner surfaces of the first and second panels are bonded directly to one another within the area of the integral frame;
wherein the structural laminate component defines an open cutout extending through the at least one of first panel and the second panel, the first and second panels not adhered or otherwise joined together within the cutout;
wherein the cutout is a handle cutout positioned within the integral frame;
wherein the core defines at least one insert void extending through the core and forming an opening in the core, and wherein a functional insert is disposed in the at least one insert void; and
wherein the functional insert is at least one of a magnet and an attachment insert disposed within the insert void.

11. The structural laminate component of claim 10 wherein an attachment insert is disposed within the insert void, the attachment insert including structure for attachment to a fastener to enable attachment of the structural laminate component to a separate component.

12. The structural laminate component of claim 11 wherein the separate component is at least one leg capable of supporting the structural laminate component above a floor.

13. The structural laminate component of claim 1 wherein the core is formed from a polystyrene foam.

14. The structural laminate component of claim 1 wherein the first and second panels are coupled in the area of the integral frame with a polyurethane adhesive.

15. The structural laminate component of claim 1 wherein one of the first and second panels defines a vent hole extending through the one of the first and second panels.

16. A structural laminate component comprising:
first and second high pressure laminate panels, each of the first and second panels having an outer surface, an inner surface, a top edge, a bottom edge opposite the top edge, and first and second lateral sides, the top and bottom edges and the lateral sides of the inner surfaces of the first and second panels continuously abutting one another and coterminous about a panel outer perimeter edge; and a core sandwiched between the first and second panels with portions of the respective inner surfaces of the panels contacting the core, the core having an outer peripheral edge spaced inwardly from the outer perimeter edge of the first and second panels; and an adhesive between the first and second panels, the adhesive directly bonding the inner surface of the first high pressure laminate panel with the inner surface of the second high pressure laminate panel in an area outside the peripheral edge of the core and adjacent to the panel outer perimeter edge, and extending around at least a portion of the panel outer perimeter edge to form an integral frame;

wherein the first and second panels are spaced apart from each other in the area of contact with the core, and wherein the first and second panels include a transition section between the core and the integral frame wherein the first and second panels converge toward each other.

17. The structural laminate component of claim 16 wherein the core is a polystyrene material and the adhesive is a polyurethane adhesive.

18. The structural laminate component of claim 17 wherein the adhesive within the integral frame extends around the entire panel outer perimeter edge.

19. The structural laminate component of claim 18 wherein at least one of the first and second panels defines a vent hole extending therethrough.

* * * * *